United States Patent Office 3,671,239
Patented June 20, 1972

3,671,239
PHOTODECOMPOSITION OF OXAZOLIDINE-
DIONES AND SIMILAR ANHYDRIDES
Arnold Zweig, Westport, Conn., assignor to American
Cyanamid Company, Stamford, Conn.
No Drawing. Filed Jan. 12, 1971, Ser. No. 105,978
Int. Cl. G03c 1/52
U.S. Cl. 96—27 R                                    4 Claims

ABSTRACT OF THE DISCLOSURE

A system for storage of information and color photography comprising the use of a dye precursor capable of photochemical conversion to a permanent visible image under light of a particular wavelength, or heat, is provided, said material being an anhydride compound of the formula:

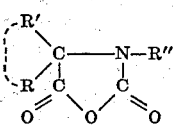

wherein R and R' each represent hydrogen, phenyl or substituted phenyl, or taken together represent a spiro-linked fluorenyl, naphthyl, or pyrozalyl substituent, and R'' represents hydrogen, phenyl or substituted phenyl.

---

This invention relates to information display and image formation by radiation and visual techniques. It more particularly relates to a system for forming a visual image in a colorless material by converting the material to a visible dye by light irradiation or heat and detecting the image visually or photometrically. Still more particularly it relates to the use of a class of aromatically substituted heterocyclic compounds which undergo photochemical conversion to produce intense colored anil dyes.

In formation display and image formation systems are of rapidly increasing importance in the present day economy in view of the exponential rise in the number and complexity of the data which must be recorded to handle the increasing everyday business load, and to assist in scientific developments.

A system for storing and displaying information is disclosed herein which comprises the following: a colorless material X, capable of photoconversion to a material Y which has an absorption band in the visible region. In the present invention formation of a permanent image is effected rapidly, accurately and with no fixing being required.

A new group of compounds is disclosed suitable for the above mentioned system which undergo photoconversion to highly yellow, orange and red anil dyes. These are aromatically substituted heterocyclic anhydrides which undergo a photochemical decarboxylation and decarbonylation in accordance with the following equation:

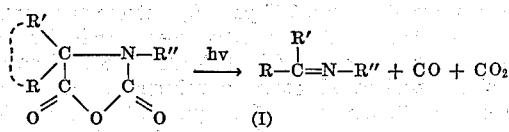

wherein R, R', and R'' are hydrogen, aromatic or substituted aromatic groups or where R and R' when taken together represent spiro substituted fluorenyl, naphthylyl or pyrozalyl groups.

This same reaction takes place when such compounds are raised to their melting point, since they decompose at that point.

Another class of anhydride compounds contemplated by the discloseure is based on the intensely colored azomethine dyes disclosed in "The Theory of the Photographic Process" 3rd edition by C. E. Mees and T. H. James published by the MacMillan Co. at page 385. Such anhydride compounds may be constructed that would photodegenerate to produce green and blue colors.

Particular anhydrides which are specifically encompassed in this invention and represented by the Formula I are: those wherein R is one selected from the group consisting of phenyl, p-dimethylaminophenyl, p-aminophenyl, p-methoxyphenyl, p-cyanophenyl, and p-nitrophenyl; R' is one selected from the group consisting of hydrogen, phenyl, p-aminophenyl, p-dimethylaminophenyl, p-methoxyphenyl, p-cyanophenyl and p-nitrophenyl; and R'' is one selected from the group consisting of hydrogen, phenyl, p-cyanophenyl, 2,4-dinitrophenyl, 4-pyridino, p-dimethylaminophenyl, p-methoxyphenyl and p-nitrophenyl.

Illustrative compounds of the class of phenyl and substituted phenyl oxazolidine-2,5-dione compounds suitable for the practice of this invention are 3,4,4-triphenyloxazolidine-2,5-dione,
4,4'-bis(p-dimethylaminophenyl)oxazolidine-2,5-dione,
3-phenyl-4,4'-bis(dimethylaminophenyl)oxazolidine-2,5-
  dione,
4-(p-dimethylaminophenyl)oxazolidine-2,5-dione,
3-phenyl-4-(p-dimethylaminophenyl)oxazolidine-2,5-
  dione,
4,4 bis(p-dimethylamino)oxazolidine-2,5-dione,
3-p-cyanophenyl-4,4 bis(p-dimethylaminophenyl)ox-
  azolidine-2,5-dione,
3-(2,4 dinitrophenyl)-4,4 bis(p-dimethylaminophenyl)-
  oxazolidine-2,5-dione,
3-(4-pyridino)-4,4-bis(p-dimethylaminophenyl)oxazoli-
  dine-2,5-dione,
4,4-bis(p-methoxyphenyl)oxazolidine-2,5-dione,
3-phenyl-4,4-bis(p-methoxyphenyl)oxazolidine-2,5-
  dione,
3-(p-cyanophenyl)-4,4-bis(p-methoxyphenyl)oxazoli-
  dine-2,5-dione,
3-(4-pyradino)-4,4-di(p-methoxyphenyl)oxazolidine-2,
  5-dione,
3-(p-methoxyphenyl)-4,4-diphenyl oxazolidine-2,5-
  dione,
3-(p-dimethylaminophenyl)-4,4-di(p-cyanophenyl)
  oxazolidine-2,5-dione,
3-(p-dimethylaminophenyl)-4,4-di(p-nitrophenyl)
  oxazolidine-2,5-dione,
3-(p-methoxyphenyl)-4,4-diphenyl oxazolidine-2,5-
  dione,
3-(p-methoxyphenyl)-4,4-di(p-cyanophenyl)oxazoli-
  dine-2,5-dione,
3-(p-methoxyphenyl)-4,4-di(p-nitrophenyl)oxazolidine-
  2,5-dione,
3-(p-nitrophenyl)-4,4-diphenyl oxazolidine-2,5-dione, A similar class of anhydrides which are specifically encompassed within the scope of this invention represented by Formula I are: those wherein R and R' taken together represent a spiro substituted substituent selected from the group consisting of fluorene-9-ylidene, 3,6-dinitro fluorene-9-ylidene, 3,6-dicyano fluorene-9-ylidene, 4-oxo-2,5-cyclohexadien - 1-ylidene, 3-(butylamino)-4-oxo-1-(4H) - naphthylidene and 1,3-dimethyl-5-oxo-2-pyrazalin-4-ylidene; and R'' is one selected from the group consisting of phenyl, p-methylphenyl, p-dimethylaminophenyl, p-nitrophenyl and p-methoxyphenyl.

Exemplary of such compounds wherein R and R' taken together represent spiro substituted oxazolidine-2',5'-dione compounds are:

3'-[phenyl]-oxazolidine-2',5'-dione spiro substituted in the 4 position by a fluoren-9-ylidene group.

3'-[p-dimethylaminophenyl]-oxazolidine-2',5'-dione spiro substituted in the 4 position by the fluorene-9-ylidene group.

3'-[p-dinitrophenyl]-oxazolidine-2',5'-dione spiro substituted in the 4 position by a fluoren-9-ylidene group.

3'-[methoxyphenyl]-oxazolidine-2',5'-dione spiro substituted in the 4 position by fluoren-9-ylidene group.

3-[phenyl]-oxazolidine-2',5'-dione spiro substituted in the 4 position by a 3,6-dinitrofluoren-9-ylidene group.

3'-[p-methylphenyl]-oxazolidine-2',5'-dione spiro substituted in the 4 position by a 3,6-dinitrofluoren-9-ylidene group.

3'-[p-dimethylaminophenyl]-oxazolidine-2',5'-dione spiro substituted in the 4 position by a 3,6-dinitrofluoren-9-ylidene group.

3'-[p-dimethylaminophenyl]-oxazolidine-2',5'-dione spiro substituted in the 4 position by a 3,6-dicyanofluoren-9-ylidene group.

3'-[p-dimethylaminophenyl]-oxazolidine-2',5'-dione spiro substituted in the 4 position by a 4-oxo-2,5-cyclohexa-dien-1-ylidene group.

3'-[p-dimethylaminophenyl]-oxazolidine-2',5'-dione spiro substituted in the 4 position by a 3-[butylamino]-4-oxo-1(4H)-naphthylidine group.

3'-[p-dimethylaminophenyl]-oxazolidine-2',5-dione spiro substituted in the 4 position by a 1,3-dimethyl-5-oxo-2-pyrozolin-4-ylidene group.

In particular, the anhydride compound 3,4,4-triphenyl oxazolidine-2,5-dione undergoes the typical reaction as follows:

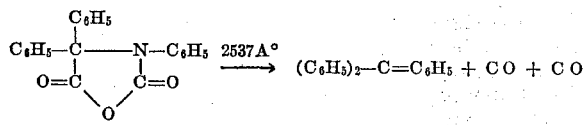

As previously indicated, the same reaction occurs under heat, such as infrared radiation or direct contact heat, for example. The radiant source may be of various types providing ultra-violet and infra-radiation including lamps, electric arcs, or ultra-violet and infra-red lasers. The image can be formed in any well known manner as by focusing a radiant beam, projecting a beam through a stencil, by use of moving mirror systems with lasers and the like. Detectable color is obtained by exposure for less than a second.

It will be understood that information formed may be of any desired type, that is, alphanumeric characters, code markings such as dots or lines, or pictorial information.

In the present invention, storage of information is rapid, accurate and dry, no fixing being required. Retrieval is rapid, exceptionally sensitive and accurate and is not accompanied by degradation. The inventive technique combines photochemical deposition of information, allowing fine resolution, with detection by photometry. As mentioned, no fixing is required where the dye precursor is only sensitive to light of wavelength of less than 290 m$\mu$.

An advantage of the present system is that any portion or entire cards or documents can be treated with dye precursor material X, after which particular information may be put on the treated part by light projection, infrared radiation, or hot die stamping. It will be apparent therefore, that many cards may be produced, with individual information placed thereon at a later time, by conversion of the desired image portion to a visible compound Y. Detection is preferably, as previously indicated, by eye or machine reading using instruments such as a tristimulus color photometer or colorimeter. The detecting radiation is of such wavelength that it does not convert any of the remaining material X to material Y.

The present material has a further characteristic that the amount of detectable color is proportional to the amount of visible color which has been converted to the colored state. The amount converted on any radiated area depends on the duration of time of exposure to the irradiating energy. The longer the time period is, the more visible color there will be converted per unit of exposed area and thus the more intense the image upon subsequent detection. This characteristic makes it possible to produce detectable tone variations over a given area. This is much like the tone variation in a photographic negative or a magnetic sound tape. Thus the present invention could be used to prepare a sound tape by audio modulation of the radiant source. The sound is detectable by conventional color detection means coupled to audio output means by a suitable transducer.

While the converted colored information cannot be optically reconverted to the anhydride non-colored state which would give an erase capability, it would be possible to insert new information and create another word or number adjacent thereto in visual precursor material X. This, of course, is limited to the area of the object which has been treated with dye precursor material X.

The dye precursor material X may be coated on any desired substrate such as paper, glass, wood, plastic, cloth, leather, and the like, or it may be incorporated in transparent or opaque plastic films. The substrate may be of any configuration, i.e., sheets, belts, discs, drums, three dimensional objects, such as bottles, boxes, and the like. Techniques for this will be readily apparent to persons skilled in the art. It will be obvious that choice of materials may depend on the particular intended use.

The dye precursor material X may be any anhydride as described above which has the desired properties, that is it has a colorless form which absorbs light, or heat, to be converted to an intensely colored dye.

The invention will be further described and illustrated by the following specific examples which are representative of the wide variety of photosensitive chromones provided thereby, unless otherwise stated, parts are by weight.

EXAMPLE 1

In a flask containing stirrer, condenser enveloped in Dry Ice and gas inlet tube was dissolved 4.20 parts of $\alpha$-anilino-$\alpha,\alpha$-diphenylacetic acid in 100 parts by volume of toluene. About 20 parts by volume of phosgene was added with stirring at 55° C. to the solution over the course of four hours. The mixture was heated two hours more, and then 14 hours without the condenser. The mixture was filtered to remove amine hydrochloride, the solvent evaporated and the residue recrystallized from benzenehexane to give 2.70 parts (59%) of 3,4,4-triphenyloxazolidine-2,5-dione M.P. 128–129° C.

Analysis.—Calcd. for $C_{21}H_{15}NO_3$ (percent): C, 76.60; H, 4.59; N, 4.25. Found (percent): C, 76.64; H, 4.52; N, 4.20.

EXAMPLE 2

To 4.92 parts of $\alpha$-chloro-$\alpha,\alpha$-diphenylacetic acid in 100 parts by volume of benzene was added 5.44 parts of N,N-dimethylphenylene-diamine. The mixture was kept at 50° C. for 14 hours. The mixture was filtered and the precipitate washed with 150 parts by volume of methanol to leave 4.10 parts (52%) of $\alpha$-(p-dimethylamino)anilino-$\alpha,\alpha$-diphenylacetic acid, M.P. 120–122°. To 1.00 part of the above acid in 50 parts by volume of toluene was added with stirring at 50° C., 5 parts of phosgene. The mixture was kept at 60° C. under Dry Ice condenser for four hours and then at 60° C. overnight without the condenser. Filtration and recrystallization of the precipitate from a small amount of methanol and water gave .430 part (40%) of 3-[p-(dimethylamino)phenyl]-4,4-diphenyl-oxazolidine-2,5-dione M.P. 184–185° C.

*Analysis.*—Calcd. for $C_{23}H_{20}N_2O_3$ (pecent): C, 74.19; H, 5.41; N, 7.52. Found (percent): C, 73.97; H, 5.25; N, 7.84.

EXAMPLE 3

To a solution of .200 part of triphenylazasuccinic anhydride in 3 parts by volume of acetic anhydride was added at 0° C. 0.4 part by volume of fuming nitric acid in 1 part by volume of acetic acid and 1 part by volume of acetic anhydride. The mixture was allowed to stand overnight, after which the solvent was removed to leave crystals. These were recrystallized from benzene-hexane and then methanol; .110 part of 3-(p-nitrophenyl)-4,4-diphenyl-oxazolidine-2,5-dione M.P. 143–144° C. was obtained.

*Analysis.*—Calcd. for $C_{21}H_{14}N_2O_5$ (percent): C, 67.37; H, 3.77; N, 7.48. Found (percent): C, 67.56; H, 3.71; N, 7.30.

The infrared spectrum (Nujol mull) shows strong peaks at 1845 and 1780 cm.$^{-1}$ (anhydride) and 1520 and 1340 cm.$^{-1}$ (nitro) and 847 cm.$^{-1}$ (p-substituted phenyl).

EXAMPLE 4

To 1.26 parts of methyl-9 anilino fluorene-9-carboxylate toluene was added 5 parts by volume of phosgene. The solution was heated four hours under a condenser enveloped in Dry Ice and then 16 hours without the condenser. The mixture was then filtered to remove traces of amino acid hydrochloride. The solvent was evaporated to leave white, crystalline material. This was heated under nitrogen to 160° C. for 15 minutes. Vigorous gas evolution occurred. The product, 3'-[phenyl]-oxazolidine-2',5'-dione spiro substituted in the 4 position by a fluoren-9-ylidene group was recrystallized from benzenehexane. At its melting point 263–265° C. the product decomposed with gas evolution and turning yellow.

*Analysis.*—Calcd. for $C_{21}H_{13}NO_3$ (percent): C, 77.05; H, 4.00; N, 4.28. Found (percent): C, 77.03; H, 3.93; N, 4.23.

EXAMPLE 5

To 18.0 parts by volume of N,N-dimethylphenylenediamine in benzene was added with stirring 12.1 parts of methyl 9-bromofluorene-9-carboxylate. The mixture was kept at 50° C. overnight and then filtered. Most of the solvent was removed and ether added to precipitate 3'-[p-(dimethylamino)phenyl] oxazolidine-2',5'-dione spiro substituted in the 4 position by a fluoren-9-ylidene group, 12.8 parts (89%), M.P. 126–130° C.

*Analysis.*—Calcd. for $C_{23}H_{22}N_2O_2$ (percent): C, 77.07; H, 6.19; N, 7.82. Found (percent): C, 77.12; H, 6.39; N, 7.85.

EXAMPLE 6

A solution of triphenylazasuccinic anhydride was nitrated as in Example 3. The residue obtained on evaporation of the solvent was extracted with boiling methanol to leave 3'-(p-nitrophenyl) oxazolidine-2',5'-dione spiro substituted in the 4 position by a fluoren-9-ylidene group as a white powder, M.P. 254–257° C.

*Analysis.*—Calcd. for $C_{21}H_{12}N_2O_5$ (percent): C, 67.74; H, 3.25; N, 7.52. Found (percent): C, 67.87; H, 3.41; N, 7.39.

EXAMPLE 7

To 1.23 parts of p-methoxyaniline in 10 parts by volume of acetonitrile was added 1.50 parts of methyl 9-bromofluorene-9-carboxylate in 10 parts by volume of acetonitrile. The mixture was heated on a steam bath two hours, and then filtered. Addition of water to the filtrate gave brown crystals. To 1.00 part of the above amino acid ester in 10 parts by volume of toluene was added 1 part by volume of phosgene. The reaction was conducted as in Example 4. The product 3'-[p-methoxyphenyl] oxazolidine-2',5'-dione spiro substituted in the 4 position by fluoren-9-ylidene group was recrystallized from acetone-water and then acetone-hexane to give .390 part of material (38%) M.P. 207–208° C.

*Analysis.*—Calcd. for $C_{22}H_{15}NO_4$ (percent): C, 73.94; H, 4.23; N, 3.92. Found (percent): C, 73.87; H, 4.42; N, 3.86.

EXAMPLE 8

In this example, 3,4,4-triphenyloxazolidine-2,5-dione which is colorless was photochemically converted to 1,1,2-triphenyl anil, a yellow colored compound. A sample of 3,4,4-triphenyl oxazolidine-2,5-dione was dissolved in polyvinyl chloride. The solution was flushed with nitrogen and irradiated with ultraviolet light from a β-H6 lamp. After a few minutes a strong yellow color was detectable without further conversion of anhydride. Comparison of the colored material with the spectrum of an authentic sample confirmed that the colored product was 1,1,2-triphenyl anil.

EXAMPLE 9

A mixture of 3,4,4-triphenyloxazolidine-2,5-dione and 3-[p(-dimethylamino)phenyl]-4,4-diphenyl oxazolidine-2,5-dione in polyvinylidine chloride was irradiated with short wavelength ultraviolet light from a β-H6 lamp as in Example 8. A strong orange colored dye could be detected after about thirty seconds without further conversion of the anhydride.

EXAMPLE 10

In the same manner as in Examples 8 and 9 a reddish yellow color was obtained by photoconversion 3-(p-nitrophenyl)-4,4-diphenyl oxazolidine-2,5-dione to 3-(p-nitrophenyl)-4,4-diphenyl anil.

EXAMPLE 11

Color was also obtained from the anhydrides of Examples 8–10, by the application of heat to decompose the anhydride. The anhydrides decompose at their melting points to the corresponding anil compounds. Heat was supplied in either the form of infrared radiation or a hot stamp directly applied to the anhydride.

EXAMPLE 12

A polyvinyl chloride solution of the compound of Example 4 was irradiated with short wavelength ultraviolet light source as in Example 8. Strong coloration could be detected after one to two minutes irradiation without further conversion of the anhydride.

EXAMPLE 13

Two solutions prepared as follows:

Solution 1

| | Percent |
|---|---|
| Anhydride of Example 2 | 5 |
| Copolymer | 95 |

A copolymer of polyvinyl chloride and polyvinylidene chloride from Goodrich Rubber Company. (Geon 222)

Solution 2

| | |
|---|---|
| Anhydride of Example 6 | 5 |
| Copolymer | 95 |

A copolymer of polyvinyl chloride and polyvinylidine chloride from Goodrich Rubber Company. (Geon 222)

Solution 1 was coated on white paper stock at a thickness of 0.3 mil.

Solution 2 was coated on the same type paper at approximately the same thickness, 0.4 mil.

The coated papers were exposed to varying intensity irradiation from a mercury light (H–100 mercury light, 2537Z°). Detectable color was obtained in about thirty seconds of exposure.

While certain specific examples and preferred modes of operation has been set forth, it will be obvious that this is solely for illustration and that various changes and modifications may be made in the invention without de-

I claim:

1. A method for storing information which comprises providing a substrate comprising at least one compound of the formula:

$$\begin{array}{c} R \\ \diagdown \\ R' \diagup \\ O \end{array} \begin{array}{c} C \longrightarrow N-R'' \\ | \\ C \\ \diagup \diagdown \\ O \end{array} \begin{array}{c} \\ \\ C \\ \| \\ O \end{array}$$

wherein R and R' each represent hydrogen, phenyl or substituted phenyl, or taken together represent a spiro-linked fluroenyl, naphthyl or pyrozalyl substituent, and R'' represents hydrogen, phenyl or substituted phenyl, and exposing said substrate to an image-forming heat or ultraviolet light pattern to convert at least a portion of said compound from its initial colorless state to a permanent colored form.

2. The process of claim 1 wherein said compound is converted by heat energy.

3. The method of claim 1 wherein said ultraviolet light is less than about 2900° A. wavelength.

4. The method of claim 1 wherein said compound is applied to a substrate surface as the initial step of the imaging process.

References Cited

UNITED STATES PATENTS

| | | | |
|---|---|---|---|
| 3,300,510 | 1/1967 | Alburn et al. | 260—307 B |
| 3,248,387 | 4/1966 | Alburn et al. | 260—307 B |
| 3,196,169 | 7/1965 | Alburn et al. | 260—307 B |
| 2,996,513 | 8/1961 | Ballard | 260—307 B |
| 2,578,293 | 12/1951 | Duschinsky | 260—307 B |
| 2,572,843 | 10/1951 | MacDonald | 260—307 B |

OTHER REFERENCES

Berichte der Deutschen Chemischen Gesellschaft, No. 9, Oct. 14, 1922, p. 189.

NORMAN G. TORCHIN, Primary Examiner

J. WINKELMAN, Assistant Examiner

U.S. Cl. X.R.

96—90 R; 260—307 B; 250—65 T